May 26, 1959  C. H. GARMAGER  2,888,122
CLUTCH PLATE
Filed Sept. 6, 1955  3 Sheets-Sheet 1
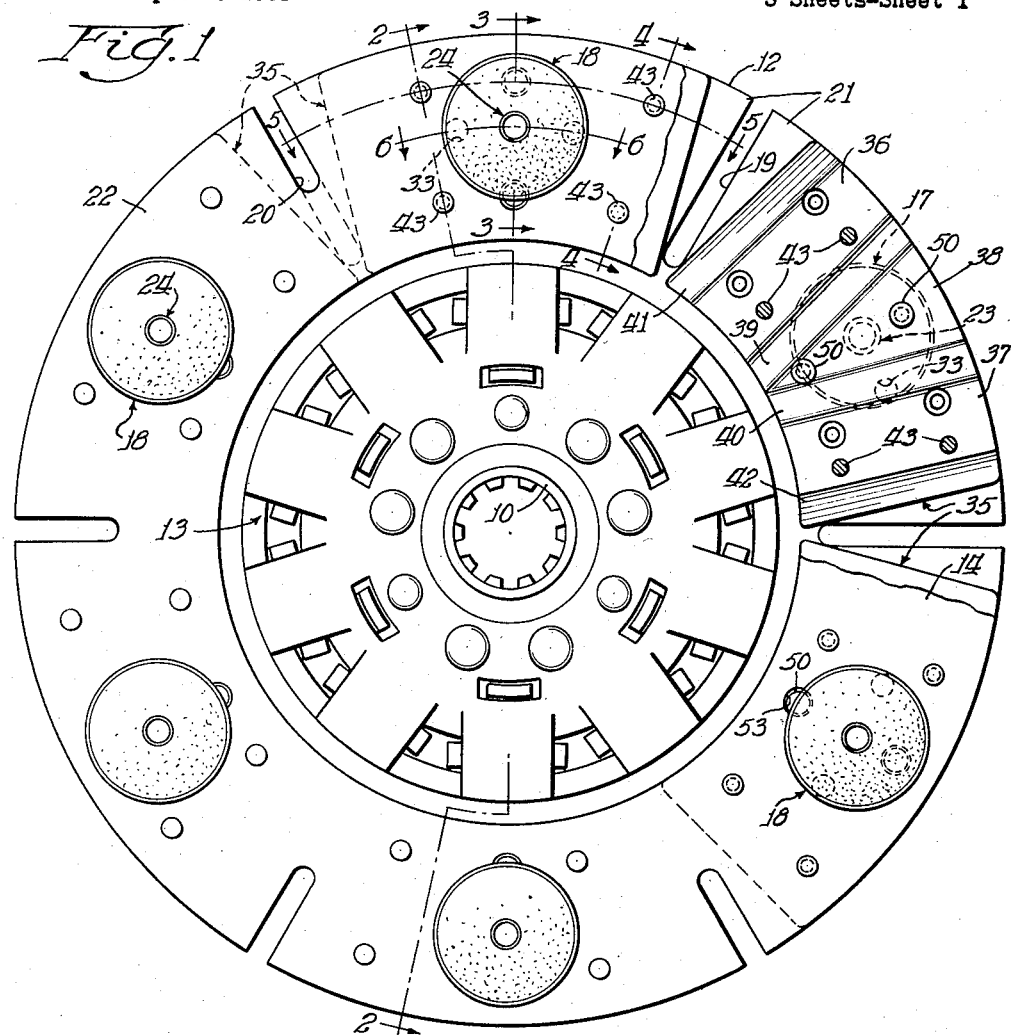
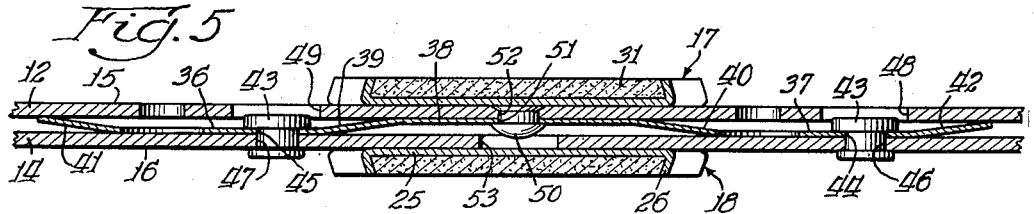
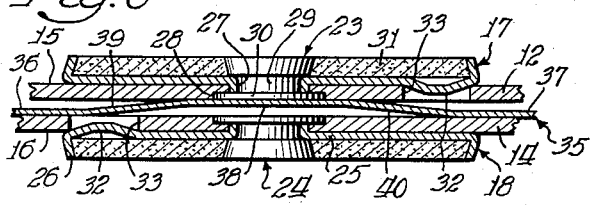
Inventor:
Curt H. Garmager May 26, 1959 C. H. GARMAGER 2,888,122
CLUTCH PLATE
Filed Sept. 6, 1955 3 Sheets-Sheet 2
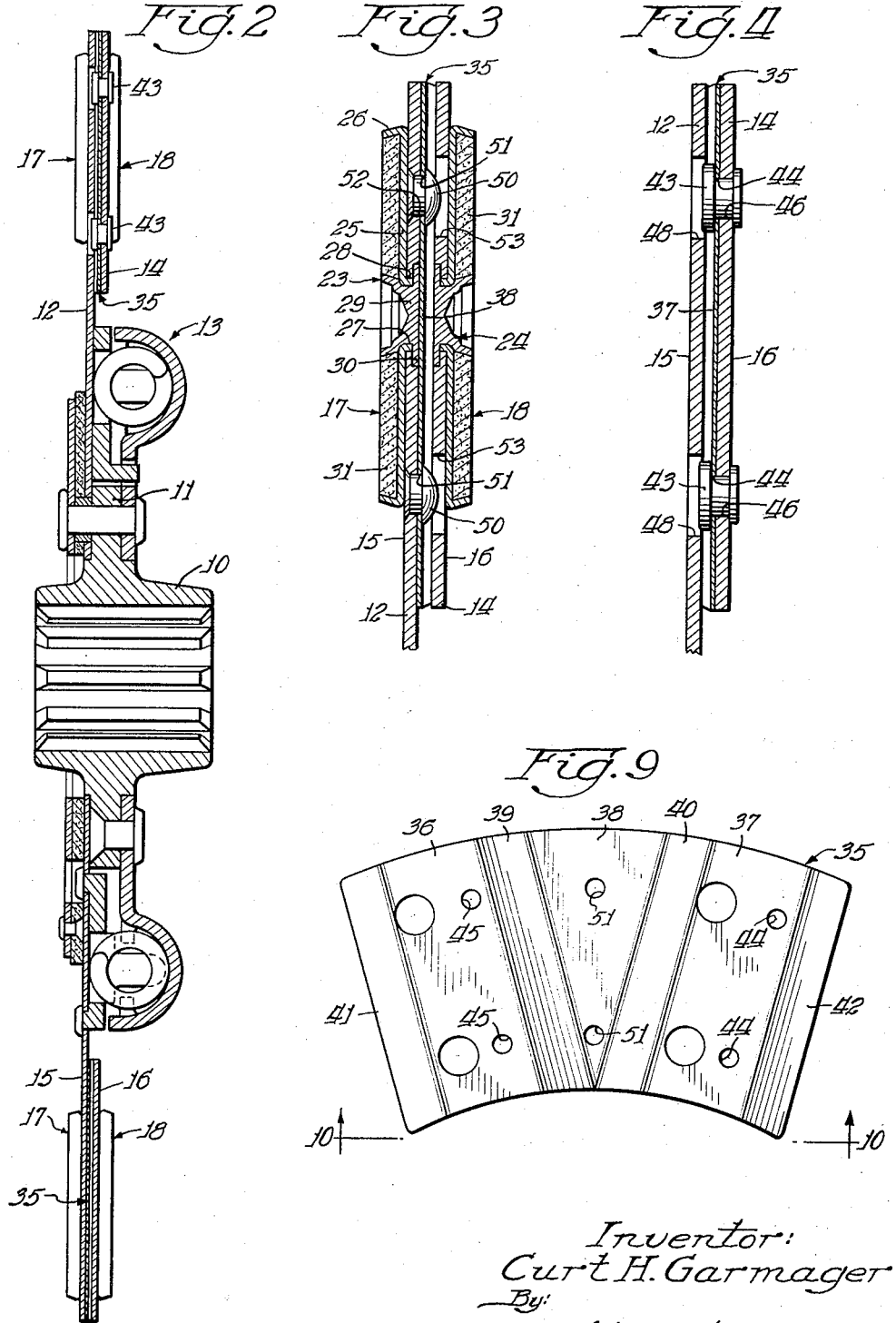
Inventor:
Curt H. Garmager
By:

May 26, 1959  C. H. GARMAGER  2,888,122
CLUTCH PLATE
Filed Sept. 6, 1955  3 Sheets-Sheet 3
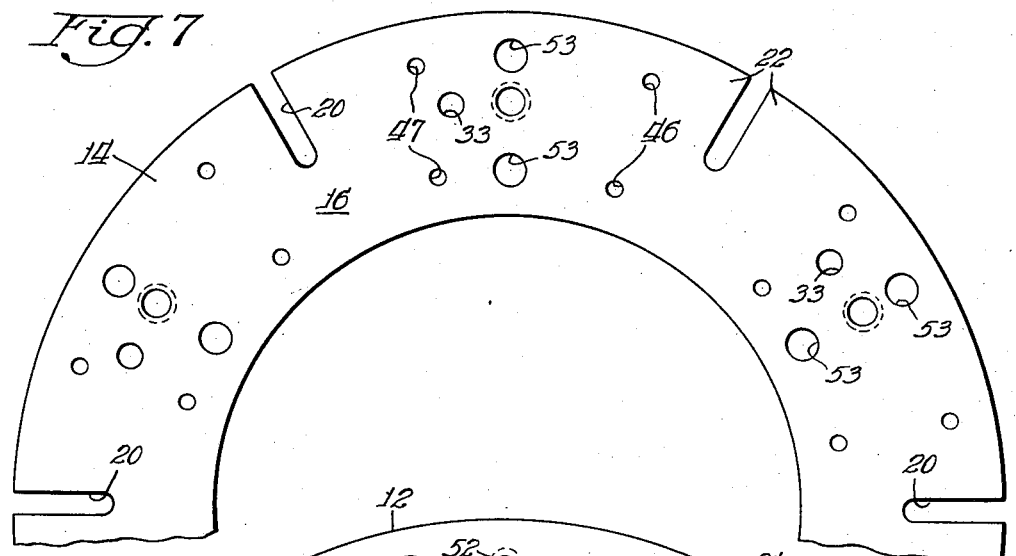
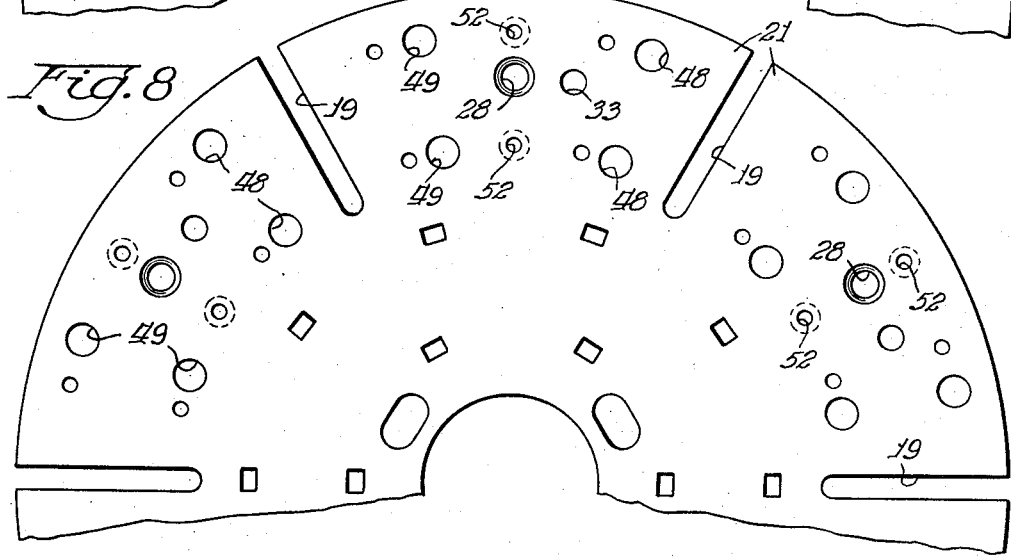
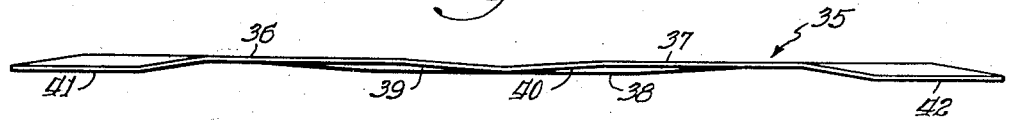
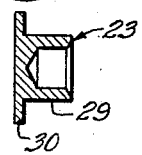 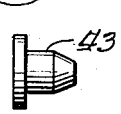 
Inventor:
Curt H. Garmager
By:
H. J. Schmid Atty

United States Patent Office 2,888,122
Patented May 26, 1959

2,888,122

CLUTCH PLATE

Curt H. Garmager, Rockford, Ill., assignor to Borg-Warner Corporation, Chicago, Ill., a corporation of Illinois Application September 6, 1955, Serial No. 532,505

2 Claims. (Cl. 192—107)

This invention relates to clutch plates, and more particularly to driven clutch plates of the cushioned type for friction clutches of the kind wherein the clutch plate is disposed between and engaged by a pair of cooperating drive plates, including a pressure plate, to transmit power between the drive plates and the driven plate. The invention relates particularly to a cushioned type clutch plate of the all-metal type and which utilizes a plurality of circumferentially spaced friction members or buttons embodying a metallic, or a mixture of ceramic and metal, friction facing materials.

Driven clutch plates of the type embodying metallic or ceramic-metallic friction buttons are now finding extensive usage in clutches in the industrial fields, particularly earth-moving machinery due to the characteristics of the friction buttons, providing exceptionally long-life and consistently good performance in heavy duty applications. Driven clutch plates of this type may prove to have a longer useful life than the other portions of the clutch associated therewith. These driven clutch plates are ordinarily provided with a plurality of circumferentially arranged and spaced friction buttons on a single disc with a rivet extending through the disc and the buttons on opposite sides of the disc to securely hold the buttons to the disc. While these driven plates are satisfactory in many applications, it has been found desirable in automotive fields, and particularly in trucks, that such driven plates be provided with means for providing a cushioning effect to afford a soft clutch action, during engagement of the clutch, to prevent chattering of the clutch.

It is an object of the present invention to provide an improved clutch plate, utilizing individual and circumferentially spaced friction members of metallic or ceramic-metallic friction material, and having cushioning means to provide a yielding engagement of the driven plate with the drive or pressure plates of the clutch.

It is another object of the invention to provide an improved friction clutch plate, of the type described having relatively yieldable and movable parts or portions for engaging friction buttons of ceramic or ceramic-metallic friction material of the plate with pressure members of a clutch whereby the clutch will take hold smoothly, easily and quickly, and thereby avoid grabbing or jerking vibrations in the clutch, engine and transmission.

A more specific object of the invention is to provide a friction clutch plate of the type embodying friction buttons formed of a metal, ceramic, or ceramic-metallic friction material in which cushions are disposed between two concentric discs with the friction buttons positioned on and circumferentially spaced about the disc.

A most significant object of the invention is to provide a friction plate structure embodying friction buttons having the friction material described, with the location of the securing means for the butons on the respective discs, and the securing means for the cushions disposed between the discs being disposed in an arrangement to prevent the securing means for the buttons and the securing means for the cushions from interfering with each other in the assembly and operation of the friction clutch plate.

Other objects and advantages of the invention will be apparent from the following description and the accompanying drawings, in which similar characters of reference indicate similar parts in several views.

In the drawings:

Fig. 1 is an elevational view, with parts cut-away, illustrating a clutch driven plate embodying the invention;

Fig. 2 is an axial sectional view taken substantially on line 2—2 of Fig. 1;

Fig. 3 is an enlarged sectional view taken on line 3—3 of Fig. 1;

Fig. 4 is an enlarged sectional view taken on line 4—4 of Fig. 1;

Fig. 5 is an enlarged cross-sectional view taken substantially along the line 5—5 of Fig. 1;

Fig. 6 is an enlarged cross-sectional view substantially along the line 6—6 of Fig. 1;

Figs. 7 and 8 are respectively fragmentary elevational views of the two discs of the friction plate;

Figs. 9 and 10 are respectively enlarged elevational and end views of one of the cushions.

Figs. 11, 12 and 13 illustrate the different types of rivets for retaining the friction buttons, disc and cushions in assembly.

The drawings are to be understood as being more or less of a diagrammatic character for the purpose of disclosing typical or preferred forms of the invention contemplated herein and in these drawings the same reference charatcers identify like parts in the different views.

The driven clutch plate illustrated in the drawing is adapted to be positioned between driving or pressure members or plates, of a clutch to transmit drive from an engine to a driven shaft connected to the driven clutch plate. The clutch plate includes a conventional hub 10, adapted to be secured to a driven shaft and having a radially outwardly projecting annular flange 11, an annular mounting plate 12 mounted upon the hub 10 through the medium of a torsional vibration dampener mechanism 13, illustrated and described in United States Patent No. 2,158,244 to A. Mistretta et al., issued on May 16, 1939.

The mounting plate 12 is a relatively thin sheet metal disc, extending the full diameter of the driven plate. A second thin sheet metal disc 14 is disposed in axial alignment with the disc 12, the discs 12 and 14 being of annular form with the inner radial periphery of the disc 14 being disposed radially outwardly of the inner periphery of the disc 12 and the vibration dampening mechanism 13, as illustrated in Fig. 2. The remote or outer flat parallel faces 15 and 16 of the axially spaced aligned discs 12 and 14 are engaged with and connected to a plurality of circumferentially spaced friction members or buttons indicated generally at 17 and 18. The friction buttons 17 and 18 are spaced circumferentially of each of the discs 12 and 14 with the buttons 17 of the disc 12 lying in radial planes intersecting the buttons 18 of the disc 14, whereby the buttons on opposite sides of the plate provide registering pairs disposed circumferentially of the plates.

Discs 12 and 14 are preferably slotted as shown at 19 and 20 to provide and accommodate thermal expansion and contraction of the discs, the slots 19 and 20 being in common radial planes intersecting the axis of the plate. The slots 19 in the disc 12 and the slots 20 in the disc 14 thus divide the outer periphery of each of these discs with circumferentially spaced sectors 21 and 22, respectively, with each sector having a friction button secured thereto as shown in Fig. 1.

The friction buttons are connected to the discs by rivets, the friction buttons 17 being connected to the disc 12 by rivet 23 and the friction buttons 18 being connected to the disc 16 by rivets 24. As shown in Figs. 3 and 6, each friction button 17 comprises an annular cup-shaped member having a wall 25 engaging the outer face or side 15 of the disc 12 with the peripheral edge of the member being defined by a generally axially extending flange 26 and the radially inner edge being defined by an axially extending flange 27 positioned within an annular opening 28 in the disc. Referring to Fig. 11, the rivet 23, prior to its assembly with the disc 12 and friction button 17, has a cylindrical body 29 provided at its closed end with a flat head 30 extending radially outwardly of the cylindrical body. In the assembly of the rivet 23 with the disc 12 and button 17, the head 30 is positioned within an enlarged portion or counterbore of the opening 28 in the disc 12 with the cylindrical body portion extending through the opening 28 in the disc and the opening in the button defined by the flange 27 thereon. The rivet 23 has its cylindrical body portion 29 deformed and expanded to conical form to extend radially outwardly to overlap the inner periphery of the cup-shaped portion to secure the same to the disc 12. Within the cup-shaped portion of each button 17 is a friction material 31 which may be formed of metal, ceramics, or a combination of metal or ceramics, having friction properties. As seen in Figs. 3 and 6, the friction buttons 18 are identical with the friction buttons 17 and are secured in a similar manner to the outer face 16 of the disc 14 by the rivets 24. As seen in Fig. 6, the buttons 17 and 18 are provided with bosses 32 protruding from the bottom of the cup-shaped portion for entry into openings 33 in the discs 12 and 14, this arrangement preventing rotation of the buttons during engagement of the clutch plate with the pressure plates of a clutch.

A plurality of cushions, such as shown in Figs. 9 and 10, are positioned between the discs 12 and 14, the cushions being generally indicated at 35 and being of thin stamped sheet metal and preferably spring steel. These cushions 35 are disposed between opposed pairs of the radially spaced sectors 21 and 22 of the plates 12 and 14, as shown in Figs. 1–4, inclusive, and arranged in annular array about the circumferences of the discs so as to be disposed between the registering pairs of the sectors 21 and 22 of the discs. As seen in Figs. 5, 9 and 10, each cushion is provided with a wavy form due to the formation of each cushion with lands 36 and 37 disposed in a common plane, and a center or intermediate portion 38 lying in a plane offset from the lands 36 and 37 and connected to the lands 36 and 37 by inclined portions 39 and 40 converging from the lands 36 and 37 to the land 38. The opposite ends 41 and 42 of the cushion are inclined relative to the plane of the lands 36 and 37 to terminate in the plane of the center portion 38. As best seen in Figs. 5 and 6, the cushions 35 are positioned between the discs 12 and 14 with the lands 36 and 37 positioned against the flat inner face of the disc 14 and the flat intermediate or central portion 38 engaging the flat inner face of the disc 12, and with the ends 41 and 42 each having line engagement with the disc 12. Each cushion has its lands 36 and 37 connected to the disc 14 by radially spaced pairs of rivets 43 extending through openings 44 and 45 in the cushion and in the openings 46 and 47 in the disc 14, a rivet 43 being illustrated in Fig. 12 prior to deformation by a clinching operation to form the rivet to the shape shown in Fig. 5, the deformed rivets securely connecting the lands 37 and 36 of the cushion to the disc 14. It will be noted that the heads of the rivets 43 engage the outer face of the plate 14 to securely hold the land to the plate 14, the heads of the rivets 43 lying in a plane substantially closer to the disc 14 than the outer friction surfaces of the buttons 18, so that the rivet heads do not interfere with the proper functioning of the friction buttons of the clutch. The disc 12 is provided with a spaced pair of clearance holes 48 and 49 at opposite sides of the friction buttons 18 and which the rivets 43 may enter during compression of the friction plate. Referring to Figs. 3 and 8, the intermediate region 38 of each cushion is secured to the plate 12 by a plurality of radially aligned rivets 50 extending through openings 51 in the cushion and having their heads engaging the region 38 of the cushion and extending through openings 52 in the disc 12 lying in a radial plane containing the rivet 23 securing the friction button 17 to the disc 12. As seen in Figs. 3 and 5, each of the openings 51 is provided in the outer face of the disc 12 with an enlarged portion or counterbore for receiving the extruded end of the rivet so that this end of the rivet lies in the plane of the flat outer side or face 15 of the disc 12 to thereby underlie the button 17 and engage the bottom wall 25 thereof. Clearance holes 53 are formed in the disc 14 to permit the heads of the rivets 50 to enter therein upon compression of the plate.

It will be seen, by an inspection of Figs. 3 and 6, the intermediate regions 38 of the cushions are disposed between the rivets 23 and 24 securing oppositely disposed and outwardly facing buttons 17 and 18 to the discs 12 and 14, respectively, the flat intermediate regions 38 of the cushions lying flush against the coplanar flat inner face of the disc 12 and the inner face of the rivet. Each rivet 24 in the disc 14 is disposed opposite a rivet 23 in the disc 12 and has the inner face thereof lying in the plane of the inner face of the disc 14, so that, upon compression of the friction plate, the intermediate portions 38 of the cushions can contact the inner face of the rivets 24 in the disc 14 to insure obtaining the maximum flexing characteristics of the cushions. It will be apparent each cushion is connected to the disc 12, extends across the space between the disc 12 and the disc 14, and is secured to the disc 14 for supporting this disc and the friction buttons mounted thereon in radially spaced relation to the torsional vibration dampening mechanism, with the spring cushions affording a cushioning action to be performed by the clutch plate upon compression of the plate. It may be noted that each of these spring cushions may be said to be of a curved or wavy formation defining peripherally spaced radially extending lands with the crests of the waves being engaged with the confronting inner faces of the discs. By positioning the cushions between buttons on opposite sides of the disc, so that the buttons are disposed on opposite sides of the intermediate region or land 38 of each cushion and with the ends 41 and 42 having their edges in engagement with the plate 12, the buttons, upon engagement by the pressure plate associated therewith will cause a uniform flexing action of the springs when the clutch is engaged and, as the greater loading compresses the plate, the area support generally increases becoming maximum when the plate is flat. During the process of becoming flat, and even when flat, the unit pressure exerted by the cushions against the inner faces of the discs varies greatly being maximum at those surfaces giving initial support to the facings. Thus, by disposing the friction buttons in their location described with respect to each other and to the spring cushions there is provided a satisfactory cushioning engagement of the clutch as the unit pressure on the friction buttons will increase sufficiently and reach maximum when the plate is under a full spring load with the results that a smooth engageemnt and good performance is obtained. It will be noted that a maximum number of cushioned members may be disposed in annular array on a given radius to provide an increased number of points or location for affording uniform flexing action of these springs contributing to a smooth acting clutch and counteracting any tendency for the clutch to chatter or grab during clutch engagement.

While one modification of the invention has been illustrated, it is to be understood that many other arrangements may be made without departing from the spirit of the invention and the invention is not limited to the precise details of the construction set forth, but only by the scope of the appended claims.

I claim:
1. In a clutch plate, first and second sheet metal discs having inner and outer faces and disposed in axial alignment with the inner faces in confronting axially spaced relation; a first set of annular friction buttons engaging the outer face of said first disc, securing members extending through said buttons and said first disc and terminating in the plane of the inner face of said first disc; a second set of annular friction buttons engaging the outer face of said second disc, said friction buttons of each disc being spaced circumferentially thereof with the friction buttons on said first disc lying in radial planes intersecting the friction buttons on said second disc; securing means extending through said second set of buttons and said second disc and terminating in the plane of the inner face of said second disc; and a plurality of separate steel spring cushion members between said discs and being of wavy form to define circumferentially spaced first and second lands axially spaced from each other, said first lands engaging the inner face of said first disc and the said terminal portions of said securing means on said first disc and said second lands engaging and connected to the inner face of said second disc; and securing members extending through said first lands and said first disc and terminating in the plane of the outer face of said first disc and engaging the buttons of said first set.

2. In a clutch plate, first and second sheet metal discs having flat parallel inner and outer faces and disposed in axial alignment with the inner faces in confronting axially spaced relation, said first disc having circumferentially spaced sets of first and second radially spaced openings therethrough, said first radially spaced opening of each set being enlarged at the end thereof terminating at the inner face of the disc and said second radially spaced opening of each set being enlarged at the end thereof terminating at the outer face of the disc, a plurality of friction members including annular cup-shaped elements engaging the outer face of said first disc and overlying said openings, said elements having central openings defined by flanges projecting into said first openings; a plurality of rivets extending within said openings of said elements and said first openings with the ends of said rivets being disposed in the plane of the inner face of said disc; a plurality of annular friction members engaging the outer face of said second disc, said friction members of each disc being spaced circumferentially thereof and a plurality of separate steel spring cushion members between said discs with each cushion member being of wavy form to define circumferentially spaced lands axially spaced from each other and respectively engaging the inner face of said first disc and said ends of said rivets and engaging and connected to the inner face of said second disc; and rivets connecting said lands engaging the inner face of said first disc to said first disc and extending through said second radially spaced openings with the ends of said rivets being disposed in the plane of said outer face of said first disc and engaging said elements.

References Cited in the file of this patent

UNITED STATES PATENTS

| | | |
|---|---|---|
| Re. 13,265 | Bowen | July 4, 1911 |
| 2,264,192 | Wellman | Nov. 25, 1941 |
| 2,589,508 | Nutt et al. | Mar. 18, 1952 |
| 2,630,199 | Gamble | Mar. 3, 1953 |
| 2,806,570 | Markus | Sept. 17, 1957 |

FOREIGN PATENTS

| | | |
|---|---|---|
| 1,105,458 | France | July 6, 1955 |

OTHER REFERENCES

Cerametallic, catalog published by Bendix Aviation Corporation, copyright 1953, Form No. 12-209, 6 pages.